(12) United States Patent
Sneed

(10) Patent No.: US 6,647,100 B1
(45) Date of Patent: Nov. 11, 2003

(54) UNIVERSAL SERIAL BUS DATAPUMP COMMAND INTERPRETER

(75) Inventor: G. Christopher Sneed, Irvine, CA (US)

(73) Assignee: Conexant Systems, Inc., Newport Beach, CA (US)

(*) Notice: Subject to any disclaimer, the term of this patent is extended or adjusted under 35 U.S.C. 154(b) by 456 days.

(21) Appl. No.: 09/626,057

(22) Filed: Jul. 26, 2000

(51) Int. Cl.[7] .............................................. H04M 11/00
(52) U.S. Cl. ................................. 379/93.05; 379/93.28
(58) Field of Search .......................... 379/93.05, 93.08, 379/93.28, 93.31, 93.01, 93.29; 375/222; 709/100; 710/20, 21, 33, 62, 63, 64, 313, 260

(56) References Cited

U.S. PATENT DOCUMENTS

| | | | | |
|---|---|---|---|---|
| 5,864,710 A | * | 1/1999 | Sands et al. | 395/825 |
| 6,112,260 A | * | 8/2000 | Colterjohn et al. | 379/93.08 |
| 6,353,857 B2 | * | 3/2002 | Bader et al. | 709/246 |
| 6,408,351 B1 | * | 6/2002 | Hamdi et al. | 710/63 |
| 6,434,161 B1 | * | 8/2002 | Higbee et al. | 375/222 |

OTHER PUBLICATIONS

*Packet Telephony Primer*, Chris Lamb, 3Com Technology http://www.3com.com/technology/tech$_{13}$ net/white$_{13}$ papers/500657.html Sep. 20, 1999.

*Modems*, Benny Assif, Yosy Breznitz, Bet–Sheva Ovadia, and Yoram Schnapp, Course: Introduction to Computer Communication, Sep. 7, 1999.

*CCSO User Guide 501: Modem Basics and Setup*, Mark S. Zinzow, Nov. 1, 1994.

* cited by examiner

*Primary Examiner*—Stella Woo
(74) *Attorney, Agent, or Firm*—Farjami & Farjami LLP (57) ABSTRACT

A communication system for communicating over a Universal Serial Bus comprising a data pump and a controller is described. The data pump is physically separated from the controller element and is responsible for conventional signal processing operations such as might be performed by a digital signal processor (DSP) The data pump communicates with the controller via a predetermined communications protocol. The controller is, typically, co-located with a host computer and is responsible for commanding/communicating with the data pump. Physically separating the modem controller function from the modem data pump function allows the manufacturing of lower cost modems. Functional separation also allows either a modem's control or data pump operations to be repaired or upgraded independently of one another. The data pump is minimally equipped to perform only those communications control and data transfer functions that require time critical performance. Memory includes a command interpretation interface for performing the time critical operations.

16 Claims, 5 Drawing Sheets

| Store/FIFO Number | Triggered | Descriptions |
|---|---|---|
| 0x0 | Data. | Modem TX FIFO |
| 0x1 | Data. | Modem RX FIFO |
| 0x2 | Data. | SR3 TX FIFO |
| 0x3 | Data. | SR3 RX FIFO |
| 0x4 | Data. | SR8 TX FIFO |
| 0x5 | Data. | SR8 RX FIFO |
| 0x6 | Data. | CID FIFO |
| 0x7-0xf | Reserved | Reserved |
| 0x10-0x1f | DP Interrupt | DP 0 executes code in Store 0. |
| 0x20-0x7f | Data. Endpoint CPU executes opcodes that transfers the store contents to the DP (probably through the scratchpad). | DP Download. Time critical DP downloads. |
| 0x80-0xff | Opcode (refer to Figure 5) | Patch execution. Time critical patches. |

Figure 4A

| ExecuteOnInterrupt (ASIC fires this off on Data pump interrupt) | | | |
|---|---|---|---|
| :loop: | Read | Parm | // AX = *Parm |
| | AndImmed | Parm | // AX &= Parm (check for data) |
| | JumpNonZero | Parm | // Parm = offset of Fini: label |
| | Read | Parm | // AX = *Parm (data from DP) |
| | Write | Parm | // *Parm = AX (to Modem RX FIFO) |
| | Jump | Parm | // offset of the :loop: label |
| Fini: | BurstRx | Parm | // Parm = Modem RX FIFO |
| | ReturnOKRef | Parm | // Return *Parm (Number of bytes in FIFO) |

Figure 4B

| WaitForExecute | | | | |
|---|---|---|---|---|
| | SetTimeout0 | Parm | // value | |
| :loop: | CheckTimeout0 | Parm | // parm = relative offset of :err: label | |
| | Read | | Parm | // AX= *Parm |
| | AndImmed | Parm | // AX &= Parm (wait for bit to set) | |
| | JumpZero | Parm | // parm = relative offset of :loop: label | |
| | ReadImmed | Parm | // AX= Parm | |
| | Write | Parm | // *Parm= AX (write a constant out) | |
| | ReturnOK | Parm | // Return *Parm (return result) | |
| :err: | ReturnError | Parm | // Return *Parm | |

Figure 4C

| Datapump Download | | | |
|---|---|---|---|
| | SetTimeout0 | Parm | // value |
| :wait: | CheckTimeout0 | Parm | // parm = relative offset of :err: label |
| | Read | Parm | // AX= *Parm |
| | AndImmed | Parm | // AX &= Parm (wait for bit to set) |
| | JumpZero | Parm | // Parm = relative offset of :wait: label |
| | Write | Parm | // Parm = Store select |
| | ReadImmed | Parm | // AX= Parm (set AX to 0) |
| | Write | Parm | // *Parm = AX (set tail index to 0) |
| | | | |
| :loop: | Read | Parm | // AX= *Parm (get Store/FIFO status) |
| | AndImmed | Parm | // AX &= Parm (check for empty FIFO) |
| | JumpZero | Parm | // parm = relative offset of :done: label |
| | Read | Parm | // AX= *Parm (FIFO R/W) |
| | Write | Parm | // *Parm= AX (to DP) |
| | Jump | Parm | // offset of the :loop: label |
| | | | |
| :done: | ReturnOK | Parm | // Return *Parm (return result) |
| :err: | ReturnError | Parm | // Return *Parm |

Figure 5

*Opcodes and Parameters*

| Opcode | Opcode Name | Opcode Description | Parm Description |
|---|---|---|---|
| 0 | Version | Return Version Number (XXXX.YYYY) | None. Set to 0. |
| 1 | Read | Read contents of register location pointed to by Parm into AX. A load from byte sources clears the upper byte. | Offset. |
| 2 | ReadImmed | Transfer Parm into lower byte of AX. Upper byte is cleared. | Parm is 8 bits. |
| 3 | ReadImmedHigh | Transfer Parm into upper byte of AX. | Parm is 8 bits. |
| 4 | Write | Write contents of AX to register location pointed to by Parm. | Offset. |
| 5 | AndImmed | Bitwise and of AX and value in Parm. AX left unchanged. Flags persist until next comparison. | Mask. |
| 6 | And | Bitwise and of AX and value in register location pointed to by Parm. AX left unchanged. Flags persist until next comparison. | Offset. |
| 7 | JumpZero | Conditional jump by number of <Opcode, Parm> tuplets. May be negative. | -128 to 127 lines (Parm is 8 bits). |
| 8 | JumpNonZero | Conditional jump by number of <Opcode, Parm> tuplets. May be negative. | -128 to 127 lines (Parm is 8 bits). |
| 9 | Jump | Unconditional jump by number of <Opcode, Parm> tuplets. May be negative. | -128 to 127 lines (Parm is 8 bits). |
| 0xa | SetTimeout0 | Sets time-out value for WaitForX opcodes. | Number of milliseconds to wait. |
| 0xb | CheckTimeout0 | If the timeout does not occur, the program execution continues on the next line, otherwise the program execution takes a jump of <Opcode, Parm> tuplets. | -128 to 127 lines (Parm is 8 bits). |
| 0xc | SetTimeout1 | Sets time-out value for WaitForX opcodes. | Number of milliseconds to wait. |
| 0xd | CheckTimeout1 | If the timeout does not occur, the program execution continues on the next line, otherwise the program execution takes a jump of <Opcode, Parm> tuplets. | -128 to 127 lines (Parm is 8 bits). |
| 0xe | Lock | Lock access to register map. | None. Set to 0. |
| 0xf | Unlock | Unlock access to register map. | None. Set to 0. |
| 0x10 | BurstTx | Transfer from Command Packet to FIFO or Store | FIFO or Store number |
| 0x11 | BurstRx | Transfer to Response Packet from FIFO or Store | FIFO or Store number |
| 0x12 | DumpCidFIFO | Transfer contents of CID FIFO to FIFO or Store | FIFO or Store number |
| 0x13 | ReturnOK | Returns OK status for the < SendPacket >. Additional parameter from AX. | None Set to 0. |
| 0x14 | ReturnOKRef | Returns OK status for the < SendPacket >. Read contents of register location pointed to by Parm into AX. | Offset. |
| 0x15 | ReturnOKImmed | Returns OK status for the < SendPacket >. Additional parameter taken from Parm. | Additional parameter. |
| 0x16 | ReturnErr | Returns Error status for the < SendPacket >. Additional parameter from AX. | None Set to 0. |
| 0x17 | ReturnErrRef | Returns Error status for the < SendPacket >. Read contents of register location pointed to by Parm into AX. | Offset. |
| 0x18 | ReturnErrImmed | Returns Error status for the < SendPacket >. Additional parameter taken from Parm. | Additional parameter. |
| 0x19 | ReturnNop | No response to Host; do not generate a response packet. | None Set to 0. |
| 0x20 | ExecuteStore | Executes current store at location pointed to by Parm. | Store number to execute. |
| 0x21 | GetStoreSize | Returns total size remaining. | None. Set to 0. |

UNIVERSAL SERIAL BUS DATAPUMP COMMAND INTERPRETER

BACKGROUND

1. Field of the Invention

The invention relates in general to the field of digital computer communications and, more particularly, to computer communications over a Universal Serial Bus communications link. Specifically, the invention describes a modem system in which the modem's digital signal processing functions is separated (functionally and physically) from the modem's controller function.

2. Description of the Related Art

High speed modem systems are typically incorporated onto an option card and usually include a "data pump" for supporting the various protocols of modem communication, such as the V.22, V.22bis, V.32 and V.32bis protocols recommended by the International Telegraph and Telephone Consultative Committee (CCITT). The data pump itself typically includes a DSP for performing modulation, demodulation and echo cancellation and a coder-decoder (CODEC) for performing analog to digital (A/D) and digital to analog (D/A) conversion. Analog signals from the phone line are digitized by the CODEC, and then demodulated by the DSP to extract the original digital data sent by an external device. This procedure is reversed for data transmitted by the modem to the external device.

The data pump is coupled to the phone line through a data channel interface. Other support logic is typically included to interface the modem to the computer system, such as a microcontroller for establishing a communications link, controlling the sequence of events to originate or answer a call, and to transmit or receive digital data from the computer system through a universal synchronous receive transmission (UART) across the I/O bus.

Low-level data pump control is needed where millisecond timing is required. Some primary items that require this kind of timing is interrupt service routines, and work-arounds (where small, but time-critical, data pump interactions are necessary). Normally, these kind of operations are shielded from upper-level control software by an additional controller (i.e., PC software controlling a modem through AT commands) An 8-bit controller provides the higher level interface to application code, for example, on the PC. Note that the controller provides for time critical operations, freeing the application code to operate the device with a high latency i/f. Specifically, the controller supports interrupts and work-arounds. In another class, the equivalent of the eight-bit controller code resides on the system as the application; the PC does the job of the 8-bit controller. This last case is not shielded from the aforementioned time critical operations, but the application can adequately service the critical operations because of the low latency i/f. Note that these operations consume system resources because the application has more to do. In general, the more latency in a link (and where the latency may be not be constant), each component has some intelligence and ability to run relatively unsupervised is required to be in order to function correctly (i.e., "loosely coupled" system). For both classes, a CPU (8-bit controller in the first case and the PC CPU in the last case) can access the device quickly and is strongly coupled to the D.P. Note that the control response time is the critical factor in determining how much latency the system can tolerate. For Universal Serial Bus (USB) applications, the PC is far away in the control/response time interval (in the sense that there is intervening software and other communication media), which make the close coupling difficult.

A problem with accessing the data pump over a USB is the latencies the host experiences when attempting to perform turn-around register level I/O with USB nodes for both data pump control operations and data access operations. These prior systems have employed a fully intelligent controller responsible for nearly all communications control. The result has been a very costly remote smart device including a fully functional microcontroller and substantial memory.

SUMMARY OF THE INVENTION

A communication system utilizing a Universal Serial Bus communications link, in accordance with the invention, is divided into two distinct elements: a data pump element and a controller element. The data pump is physically separated from the controller element and is responsible for conventional signal processing operations such as might be performed by a digital signal processor (DSP). Communication is effected between the host (i.e., PC) and the data pump over the USB communications bus with the data pump located at a USB node. The data pump communicates with the controller via a predetermined communications protocol. The controller is, typically, co-located with a host computer and is responsible for commanding/communicating with the data pump. Removing the controller from the USB node to the host introduces large latencies. However, to combat latencies introduced by the USB pipe, time intensive control code is executed at the USB node as a set of interpreted commands. This interpreted set of commands is very low level requiring only minimal intelligence and memory at the USB node, but high enough to relieve timing latencies. Separate control and signal processing is provided so that modems can be manufactured with fewer components. These features translate into less expensive modems.

BRIEF DESCRIPTION OF THE DRAWINGS

A better understanding of the present invention can be obtained when the following detailed description of the preferred embodiment is considered in conjunction with the following drawings, in which:

FIGS. 4A, 4B and 4C are examples of time critical communication routines.

FIG. 5 is a table listing opcodes stored within the command interpreter in accordance with the invention.

DETAILED DESCRIPTION OF PREFERRED EMBODIMENT

The illustrative system described provides efficient communications over a communications network. For purposes of explanation, specific embodiments are set forth to provide a thorough understanding of the illustrative system. However, it will be understood by one skilled in the art, from reading the disclosure, that the technique may be practiced without these details. Further, although the embodiments are described in terms of a data pump, it should be understood that this embodiment is illustrative and is not meant in any way to limit the practice of the disclosed system to other digital signal processing devices. Also, the use of the terms Universal Serial Bus to illustrate how the system works is not intended to infer that the illustrative system requires a specific type of communications bus. Rather, any of a variety of communications link may be employed in practicing the technique described herein. Moreover, well-known elements, devices, process steps, and the like, are not set forth in detail in order to avoid obscuring the disclosed system.

Modem System

Figure 1:
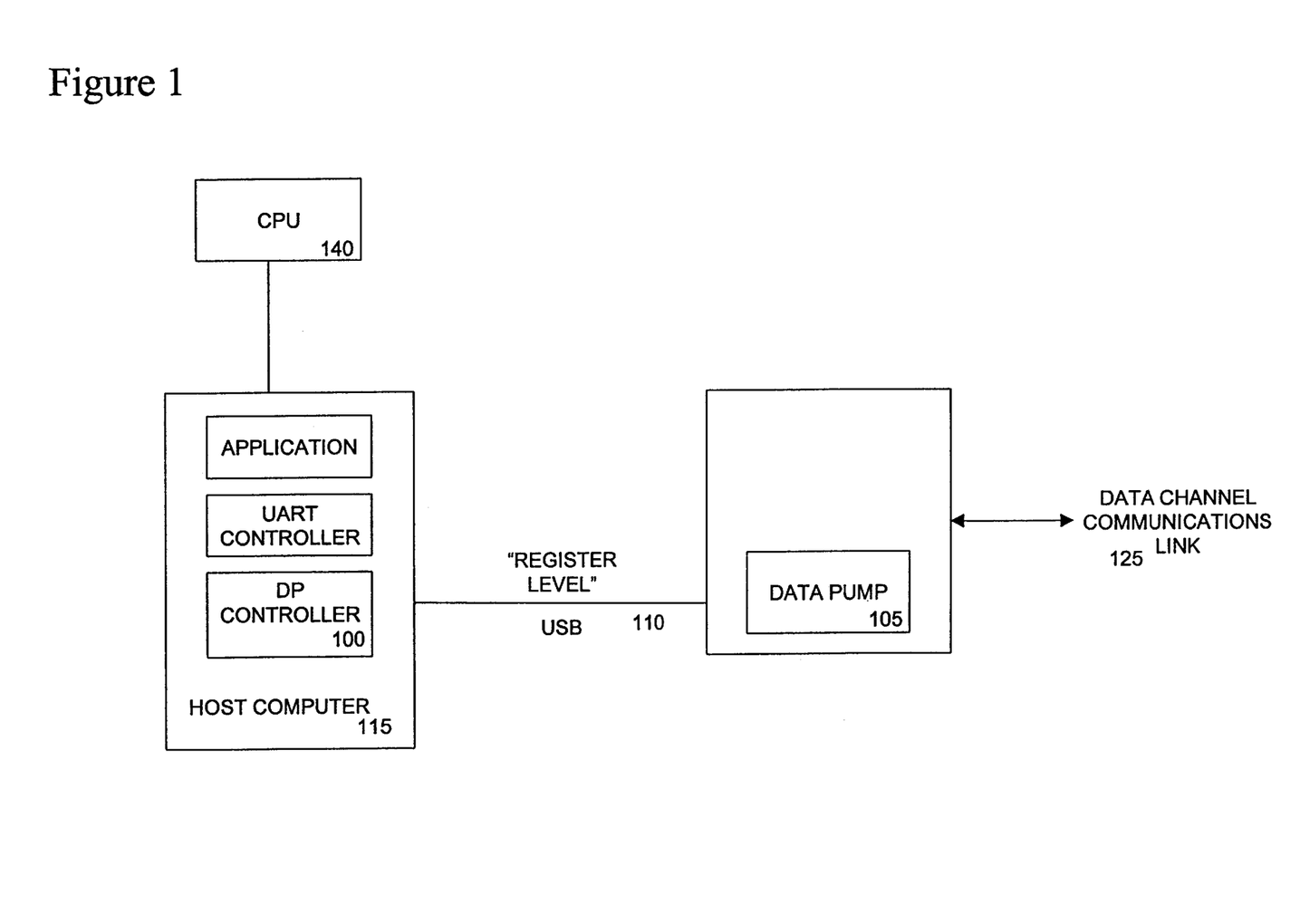
FIG. 1 is a high-level block diagram of a modem system in accordance with the invention.

FIG. 1 shows one embodiment of a modem, in accordance with the invention, that has a controller 100 and a data pump 105 which communicate via a data pump-to-controller communications link 110. The controller can be implemented as a method that is executed by a host computer's 115 central processing unit 140 (CPU). Alternatively, the controller can be implemented as a separate hardware device that is operatively coupled to the host CPU (e.g., via a common bus).

The controller 100 is configured to communicate with (that is, issue commands and accept input from) the data pump 105 through a predefined protocol. Physical connection between the host computer 115 and the data pump 105 can be provided by any convenient means such as a parallel or serial interface.

The data pump 105 is designed to provide conventional signal processing capability and the capability to communicate with both the controller 100 and an external data-channel 125. In addition to providing conventional digital signal processing capabilities, the data pump implements a set of control functions that enable interaction with the controller. According to the present invention, the data pump 105 is particularly suited to satisfy certain timing constraints for communications where the communications link 110 is a USB link. Specifically, latencies introduced by the USB protocol are avoided by the use of an interpreted set of commands within the remote data pump 105, discussed in more detail with reference to FIGS. 2 and 5.

Controller

A portion of the control and data pump operations can be accomplished by defining, and implementing, a set of commands and configuration messages in which the two elements (controller 100 and data pump 105) are required to respond. As discussed above, the controller 100 retains all but the time critical portions of the control code. By taking advantage of the reliable and efficient communication capabilities of the host computer 115 over the communications link 110, the majority of the communications functionality is performed remotely off of the USB node, the data pump 105, by the host computer 115. In this way, the controller 100 is remotely closely coupled to the data pump 105 controlling nearly all of the functions necessary for communication. In addition, since the majority of processing activity is performed within the host, overhead can be removed from the data pump resulting in significant silicon and cost savings.

Data Pump

Figure 2:
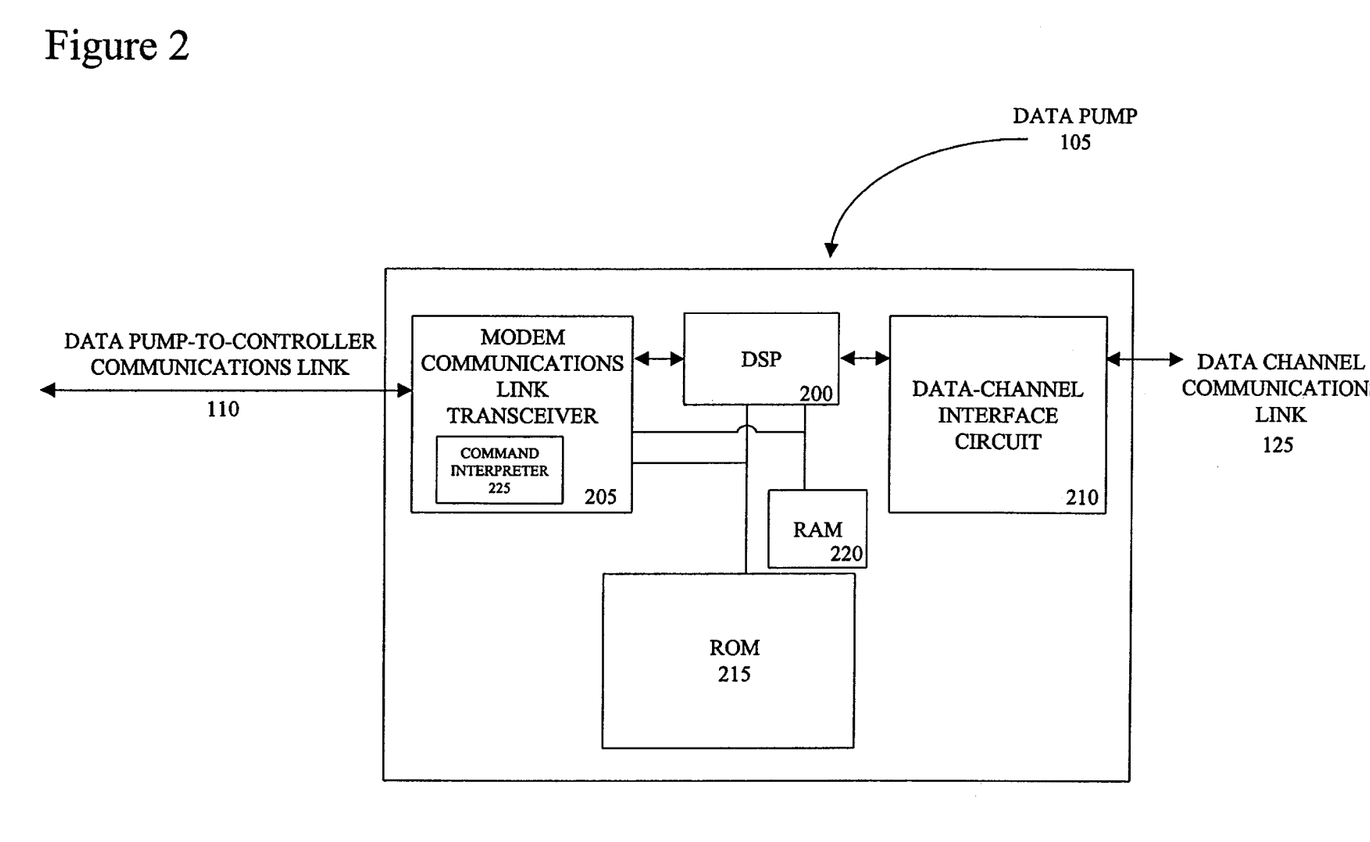
FIG. 2 is a high-level block diagram for one embodiment of a data pump in accordance with the invention.

FIG. 2 shows a data pump, in accordance with the invention, that comprises a digital signal processing (DSP) unit 200, a modem communication link transceiver circuit 205, a data channel interface circuit 210, read only memory unit 215, and random access memory unit 220. The data pump 105 collectively and its components are minimally sufficient to perform only the time critical communication functions. Some primary functions that require this kind of timing is interrupt service routines (ISR) and work-arounds (where small, but time-critical, data pump interactions/interventions are necessary). These ISRs and work-arounds are typically performed by an agent outside the data pump, typically a small controller within the modem communications transceiver block 205. In addition, for control operations, not directly tied to data interrupts, timely access to data pump registers may be critical. For example, there is no problem with the host performing a set of writes, assuming that the first write is not overly time-dependent on the last data pump operation and that the return value is not overly critical to the next set of data pump operations. If the host wants to do a set of writes, a read, and more writes, this may be a problem. This last transaction has a two millisecond delay just over the USB pipe, not counting any latencies the USB host stack introduces. In some cases, code may not tolerate these latencies. Because of this USB pipe latency, data pump operations must be grouped in the millisecond range of time-dependent operations. Because the total system latency, it is best to group the data pump operations into the high single digit millisecond range.

Digital Signal Processing (DSP) unit 200 provides the computational engine to process signals sent to the data pump 105 from either a host computer (via the data pump to controller communication's link 110) or from an external source via data channel communication link 125. As discussed, the DSP 200 can be made to process a selected number of control commands via the command interpreter 225 within the transceiver block 205, for time critical functions. The command interpreter 225 logic may alternatively be located in the DSP 200. In this respect, the command interpreter 225 implements a restricted number of control functions. The majority of typical DP control functions performed by previous controllers including data encoding, decoding, encryption, decryption, protocol encapsulation/decapsulation,call setup, and call tear-down remain at the host computer 115.

Modem communication link transceiver circuit 205 provides the logical and physical interface between the data pump-to-controller communications link 110 and the DSP 200. Conventional serial or parallel interfaces can be used and implemented in any convenient manner, i.e., direct cable, infrared or radio frequency links.

Data channel interface circuit 210 provides the physical interface between the data pump's DSP 200 and an external data channel such as a telephone line, optical cable, or wireless transmitter. It is noted that the external data channel can be analog or digital in nature.

The data channel interface electronically isolates the modem from the phone line to control emissions of electromagnetic interference/radio frequency interference (EMI/FI) as required by the Federal Communications Commission (FCC). The data channel interface also typically isolates the received signals from the transmitted analog signals, and develops a digital ring signal to inform the computer system to answer. The data channel interface receives signals from the phone line through a telephone jack, such as an RJ11C used for standard telephones.

ROM 215 serves as a conventional repository of program control instructions and data lookup necessary for the command interpreter 225 either as state machine logic or program code. It is ROM memory that generally contains the instructions necessary for the command interpreter 225 to perform its operations such as command interpretation and configuration message generation. The command interpreter 225 is a special purpose signal processing set of instructions that is stored in the ROM memory. As mentioned, the ROM memory 215 is only minimally sufficient to store the limited set of information necessary for the command interpreter 225 to perform command interpretation from the data pump controller. In this way, the full set of AT commands required by prior loosely coupled systems is unnecessary and valuable cost and silicon are saved.

RAM 220 is a conventional memory used for temporary or dynamic storage of data and program instructions needed by the command interpreter 225 during the limited data pump 105 operations. Like ROM 215, RAM 220 is only minimally sufficient to provide the temporary data and instruction storage required by the command interpreter 225 to perform the time critical functions. According to one embodiment, 32k of RAM is sufficient without any additional external memory.

Both ROM 215 and RAM 220 memory can be used to store data needed to operate the modem communication link transceiver 205 and data channel interface 210 circuits.

Because the command interpreter 225 can be programmed via the communications link 110, ROM 215 may in fact be RAM, EEPROM, flash memory, or other suitable storage (except for a small boot section if necessary to control command interpreter download). It should be noted that the command interpreter 225 including ROM 215 and RAM 220 may be implemented as an ASIC or using a remote, on-board processor that is minimally sufficient to perform the time critical features. Of course, an embodiment utilizing the remote processor includes obvious flexibility advantages during design, development and testing.

Stores

One consequence of separating the control and data pump functions is the need to account for the latency between the issuance of a command by the controller 100 and its execution and response by the data pump 105. As described above, this is accomplished by identifying, for each response, the command to which that response is associated.

Stores are locations in the USB endpoint that perform functions not possible with Host Command Packets because of time constraints. According to one embodiment, there are three configurations shown in FIG. 3. Each is activated in three different ways. Note, host transfers to and from each store is performed on a first-in/first-out basis.

Figure 3:
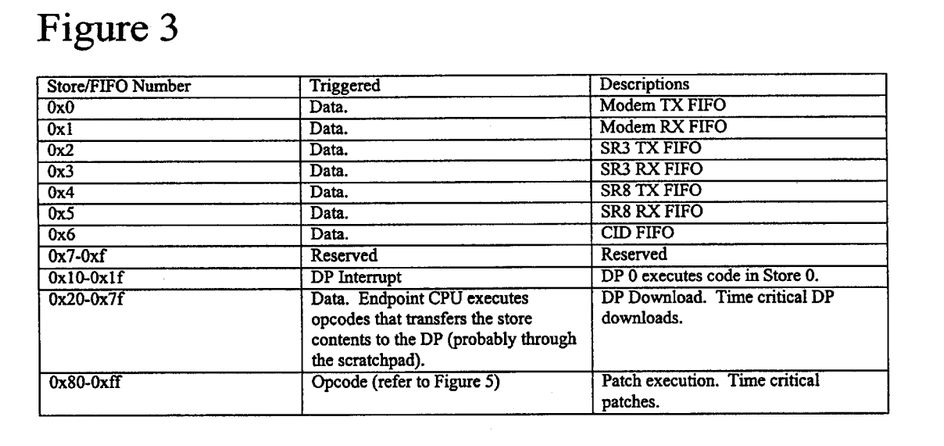
FIG. 3 is a table illustrating a setup and description for stores in the data pump.

For example store locations 0×0–0×6 contain predefined data such as outgoing modem transmit data at store 0×0 or incoming modem receive data at store 0×1. Stores 0×10–0× 1F are executed upon an interrupt to the data pump from the controller 100. Store locations 0×20–0×7F also contain data which the CPU 140 or the DP controller 100 transfers directly to the data pump, for example through a scratch pad. These data pump downloads are typically time critical data pump downloads. Finally, store location 0×A80–0×FF are executed upon receipt of a special opcode from the data pump controller 100. Once the out code is received at the data pump 15, the set of instructions stored in ROM 215 is initiated for patch execution. Each of the opcodes are restricted to time critical patches. Thus requiring the RAM 220 to contain only a limited set of instructions for executing small fragments of code. Specifically, the patch is actually opcode operations for the most part does not contain any download code or data pump code. Patches typically control the data pump operations at a very fine level, actually peeking and poking data pump memory.

Note that the Patch Store may do the same function as the Download Store. This may be accomplished by the code executing inside the Store setting the read FIFO pointer to a location inside the Store that has the download code (probably right after the code in the store), and transfer these non-executed bytes to the data pump.

Operation

Turning to FIGS. 4A and 4B, shown are examples of time critical functions requiring control by the data pump 105, not the host computer 115. Note that all USB data transfers are host initiated. The host sends data to the USB node in a straightforward fashion. For unsolicited reads, the USB, must first send an USB interrupt packet to the Host, which then sends an USB receive packet. This packet signals the USB endpoint to send the data to this Host.

The host sends a <SendPacket> to the USB data pump 105. It is expected that the data pump 105 will interpret the contents of the <SendPacket>, do the operations coded by interpreted opcodes, and return the results by using the <ReceivePacket>. This type of transfer is called a Solicited response. Note that <SendPacket> and <ReceivePacket> are not USB entities; USB packets encapsulate USB data pump packets.

The data pump 105 may also generate a <ReceivePacket> to transfer data to the host 115 (the actual USB mechanism would be an USB Interrupt packet followed by a USB Read Request) without a proceeding <SendPacket>. Such an event could be a data pump status change interrupt. Normally, processing a data pump interrupt requires multiple read, test, and write operations on the scratchpad to get the data or the complete status. Instead of hardcoding this code in the data pump, the host sends a <SendPacket> that the data pump stores and executes on a data pump interrupt. It is expected that the interrupt processing of the stored <SendPacket> is deferred until the processing of a current <SendPacket> is completed. Note that the ASIC defers sending the <ReceivePacket> to the host until the <SendPacket> is completely processed.

Host Commands to the USB Node

The format of the <SendPacket> is as follows:
<SendPacket>=<PacketLen, Seq, <Opcode, Parm>, <Opcode, Parm>, . . . , <Opcode, Parm>> or
<SendPacket>=<PacketLen, Seq, <ImplicitFifo Tag, DataLen, Value, Value, . . . >, <Opcode, Parm>, <opcode, Parm>, . . . , <Opcode, Parm>>

| Field | Length in bytes |
|---|---|
| PacketLen | 2 |
| Seq | 1 |
| Opcode | 1 |
| Parm | 1 |
| ImplicitFifoTag | 1 |
| DataLen | 2 |
| Value | 2 |

PacketLen is the total number of bytes in SendPacket.

Seq is a host assigned sequence number that the ASIC uses in the <ReceivePacket>. For the stored <SendPacket>, the ASIC uses that Seq for all following interrupts. This means that the host should not use this Seq for Solicited <SendPacket>'s.

<Opcode, Parm> is a basic operation. Each basic operation is a read, write, and etc. command (Opcode), and a parameter that is used in the processing of the <Opcode, Parm>. The maximum number of <Opcode, Parm> tuplets is only limited by the size of the USB Buffer. The minimum number of pairs is zero (PacketLen is zero).

<ImplicitFifo Tag, DataLen, Value, Value, . . . > is used only for data transfers to a store (Execute or Download) or FIFO. The number of Value bytes after the ImplicitFifo Tag is only limited by the maximum USB buffer size. It may take additional <SendPacket> with ImplicitFifo Tag fields to complete a Store of FIFO fill (each Store is a FIFO for the purposes of loading). An <SendPacket> may contain only one ImplicitFifo Tag and this tag must be at the start of the <SendPacket> packet. DataLen is the number of Value entries following. DataLen is two bytes in length. Each Value is one data byte. Note the <Opcode, Parm> tuplets in this <SendPacket> may operate on the Value data, treating it as a FIFO.

USB Node Responses to the Host

The format for the <ReceivePacket> is as follows:
<ReceivePacket>=<PacketLen, Seq, Status, Value>

| Field | Length in bytes |
|---|---|
| PacketLen | 2 |
| Seq | 1 |
| Status | 1 |
| Value | 2 |

PacketLen is the total number of bytes in <ReceivePacket>.

Seq is the host assigned byte in the corresponding <SendPacket>.

Status is the result of the <ReceivePacket>. The ASIC generated the status based on the instructions in the <OpCode, Parm> tuplet that terminates processing of the Packet.

Value is additional data byte that the corresponding <SendPacket> may return. Note that the Host may have to respond to an USB Interrupt request first before receiving this packet. Set Value equal zero for void returns.

Note that the stored interrupt routine will use the Seq value repeatedly.

Operation Examples

Both of the examples in FIG. 4A and FIG. 4B are performed by the data pump 105. As such each of the required opcodes in the routines are stored in the command interpreter 225 to allow for fast runtime performance. Time consuming interim look-up communication between the data pump 105 and the host computer 115 is thereby avoided.

FIG. 4A is an exemplary fragment of executable code which executes off of a data pump interrupt such as for store location 0x10–0x1F. For example, the execute on interrupt routine will be executed when there is data to be read from the data pump 105. For proper execution, the data must be moved from the data pump before the data pump overrides its internal buffer. Thus, such a operation is a time critical operation. On a register level basis over the USB interface, it would not be possible to get the data fast enough to avoid a premature override of the data. Specifically, the following USB sequence is not fast enough (1) signaling the host; (2) host servicing a signal; (3) host sending down the opcode fragment; and (4) returning the data to the host. According to an embodiment, the execute on interrupt routine and code is stored and executed at the data pump endpoint 105.

FIG. 4B illustrates another time critical operation, wait for execute. The wait for execute routine may used when a work around is required, where it may be necessary to wait for a specific condition to occur within the data pump, such as a read of a memory location, and quickly alter another value within the data pump, such as another memory location.

Finally, turning to FIG. 4C shown is a exemplary data pump download operation performed at the data pump endpoint 105. For time critical data pump downloads, it is not possible to wait for a condition to occur and then execute the data pump download in the appropriate time window. The steps of FIG. 4C are all performed at the data pump endpoint 105. First, the endpoint waits for a bit to be set, basically remaining in a loop till the monitored bit is changed. After the bit is set, download status is active to go ahead and select a store to select the appropriate data pump code. Once the store is set, the store is read to determine whether the status of the store is empty or not. If empty, the operation is done. Otherwise data is read from the store and written to the data pump and the operation is complete. Here again, this is an example of a time critical operation that if performed at the register level across the USB interface would have too many latencies involved to complete the operation within the time constraints required. It is important to note that each of these examples are typical of the small code fragments that may be performed at the data pump endpoint 105.

Opcodes

According to one embodiment, the command interpreter 225 contains the opcodes and parameters shown in FIG. 5. Although different opcodes could be included in the command interpreter 225, only those opcodes and parameters that are required by the data pump to perform the limited set of functions which are time critical are contemplated. FIG. 5 illustrates along with each opcode, the description of the opcode and the value or type of associated parameter.

As will be apparent to one of ordinary skill having the benefit of this disclosure, implementation of a different function such as a telephone answering or facsimile machine can easily be accomplished by implementing a different command set. This versatility is attributable to the architecture of the system in that the controller and data pump elements are functionally separated.

A modem system, in accordance with the invention, is divided into two distinct elements: a data pump element and a controller element. The data pump is physically separated from the controller element and is responsible for conventional signal processing operations such as might be performed by a digital signal processor (DSP). Communication is effected between the host and the data pump over a USB communications bus with the data pump located at a USB node. The data pump communicates with the controller via a predetermined communications protocol and a set of interpreted commands within the 225. The logic and interpretation features are minimally sufficient to perform time sensitive processing while relegating all other non-time-critical processing to a data pump controller within the host computer.

The foregoing disclosure and description of the various embodiments are illustrative and explanatory thereof, and various changes in communication network, the descriptions of the data pump, the host computer, and other circuitry, the organization of the components, and the order and timing of steps taken, as well as in the details of the illustrated system may be made without departing from the spirit of the invention.

I claim:

1. A communication system comprising:
   a data pump controller for performing first communications control functions;
   a communications data link coupled to said data pump controller; and
   a data pump coupled to said communications data link, wherein said data pump communicates with said data pump controller over said communications data link, said data pump having a command interpreter for performing second communications control functions;
   wherein said first and second communications control functions control operations of said data pump, and wherein said communications data link would cause a latency greater than an allowed execution time of each of said second communications control functions and less than an allowed execution time of each of said first communications control functions.

2. The communications system of claim 1 wherein the communications data link is a Universal Serial Bus.

3. The communications system of claim 1 wherein said data pump controller generates one or more data pump controller command signals to be sent to said data pump.

4. The communications system of claim 3 wherein said data pump controller command signals comprise a series of one or more instructions to perform a specified one or more signal processing operations.

5. The communications system of claim 4 wherein said data pump processes said one or more instructions and performs said one or more signal processing operations when said one or more signal processing operations requires time critical performance in accordance with said data pump controller command signal.

6. The communications system of claim 1, wherein said communication link is a serial cable having two ends respectively connected to said host processor and said modem.

7. The communications system of claim 1 where said data pump generates one or more data and control signals to be sent to the data pump controller via said communications link.

8. The communications system of claim 7 wherein said data pump controller processes said one or more data and control signals in accordance with said data pump controller command signal.

9. A modem under control of a controller via a communication link, said controller including a controller code, said modem comprising:
   a command interpreter at a first end of said communication link, said command interpreter configured to communicate with said controller at a second end of said communication link; and
   a digital signal processor (DSP) at said first end of said communication link, said DSP being coupled to said command interpreter,
   wherein said controller code controls a first operation of said DSP, wherein said command interpreter includes an interpreter code for controlling a second operation of said DSP, and wherein said communication link would cause a latency greater than an allowed execution time of said second operation and less than an allowed execution time of said first operation.

10. The communication system of claim 9, wherein said second operation is an interrupt operation caused by said DSP.

11. The communication system of claim 9, wherein said interpreter code includes a patch for modifying a third operation of said DSP.

12. The communication system of claim 9, wherein said controller modifies said interpreter code via said communication link.

13. The communication system of claim 9, wherein said controller reads data from said DSP via said communication link and said command interpreter.

14. The communication system of claim 9, wherein said controller writes data into said DSP via said communication link and said command interpreter.

15. The communication system of claim 9, wherein said communication link is a Universal Serial Bus (USB) link.

16. The communication system of claim 9, wherein said controller controls said first operation of said DSP via said command interpreter.

* * * * *